No. 855,711. PATENTED JUNE 4, 1907.
C. O. LAMBERT.
AUTOMATIC STOP FOR AUTOMOBILES.
APPLICATION FILED FEB. 27, 1900.
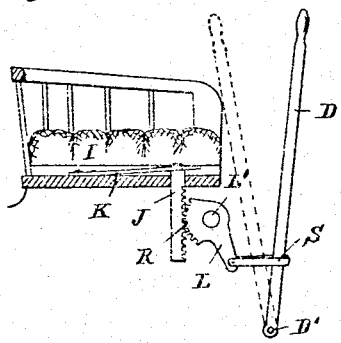
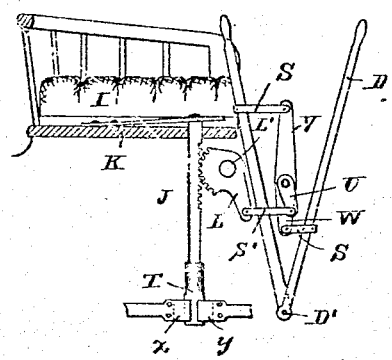
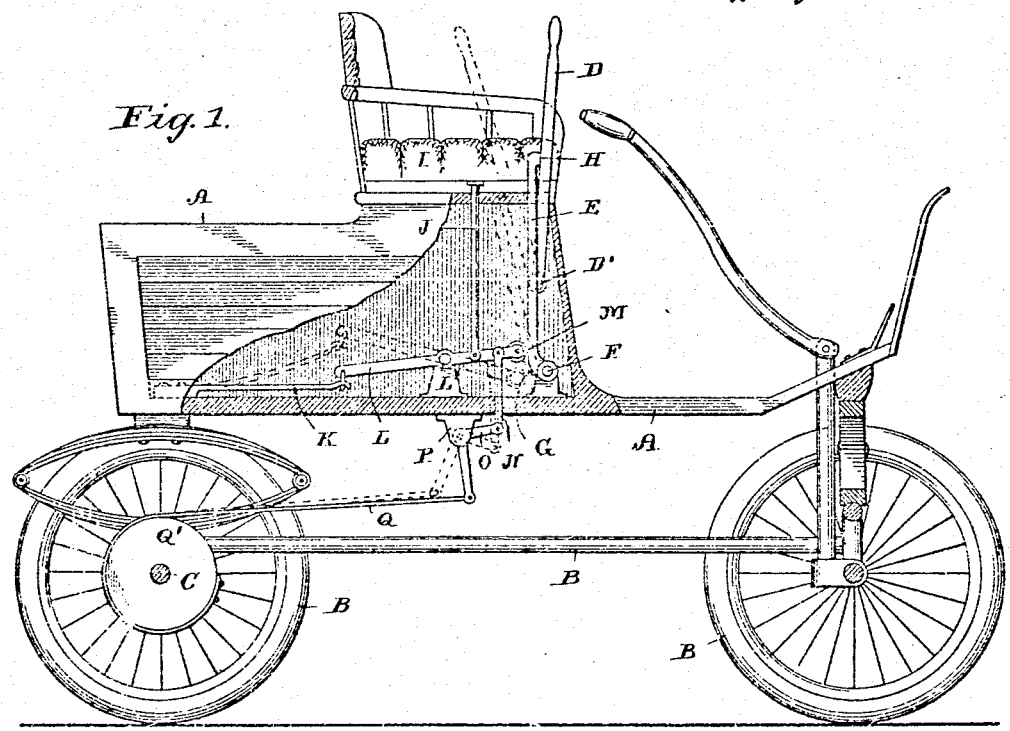
Witnesses
R. H. Newman
Edward K. Nicholson
Inventor
Charles O. Lambert
By Chamberlain & Newman
Attorneys

UNITED STATES PATENT OFFICE.

CHARLES O. LAMBERT, OF BRIDGEPORT, CONNECTICUT, ASSIGNOR, BY MESNE ASSIGNMENTS, TO ELECTRIC VEHICLE COMPANY, OF HARTFORD, CONNECTICUT, A CORPORATION OF NEW JERSEY.

AUTOMATIC STOP FOR AUTOMOBILES.

No. 855,711.          Specification of Letters Patent.          Patented June 4, 1907.

Application filed February 27, 1900. Serial No. 6,728.

*To all whom it may concern:*

Be it known that I, CHARLES O. LAMBERT, a citizen of the United States, and a resident of Bridgeport, in the county of Fairfield and State of Connecticut, have invented certain new and useful Improvements in Automatic Stops for Automobiles, of which the following is a specification.

My invention relates to new and useful improvements in means for automatically stopping power driven vehicles should the driver or operator be suddenly thrown out or otherwise unseated and consequently unable to stop the machine.

The style of vehicle for which the invention has been specially designed is automobiles and it is equally applicable to any of the various makes of machines whether driven electrically, by steam, or otherwise. It will also be obvious that while, as above stated, it is particularly desirable on the class of vehicles named, its use need not be limited to such since it may also be employed to great advantage on other devices.

It is the object of my invention to provide reliable and practical mechanism whereby the power of an automobile may be instantaneously cut off and the vehicle stopped should the driver become suddenly dislodged by reason of collision or otherwise, thereby preventing the machine from running away and incurring damage.

With the above objects in view I have devised the novel construction shown on the accompanying sheet of drawing forming a part of this specification, upon which similar letters of reference denote like or corresponding parts throughout the several figures, and of which:

Figure 1, illustrates a side elevation partly broken away, of one type of an automobile fitted with my improvement. For illustration as will be seen we have omitted from this drawing the driving medium which forms no part of my invention. Fig. 2, shows a detail view of a slightly modified form of construction of my invention, and Fig. 3, illustrates a further manner of putting my invention into effect, the same being illustrated with special reference to twin operating levers and electrically driven devices.

As above stated the propelling medium of this type of vehicle vary materially, some being driven by steam, others by electricity, compressed air, etc. The operating medium, however, of most all the American types of machines comprise one or more levers which are arranged adjacent to the seat occupied by the driver, the lower end of said levers being attached to a rock shaft or other means of connections with the valves or switches controlling the power. For the above reason and for the purpose of clearness I have omitted from the drawings any illustrations of said power mechanism or its connections with the controlling levers and will describe my invention as it would be applied in practice.

Referring to the characters of reference marked upon the drawings A indicates the body of an automobile which is mounted upon a familiar type of running gear B—B of which C represents the rear axle and to which the power is usually applied.

D indicates the operating or controlling lever which is pivoted at D' and from which point further connections with the power mechanism of the machine in practice are made. This lever in some instances and as illustrated in Fig. 1 is intended to be drawn backward to start the machine and thrown forward as indicated in full lines to stop it. The order of movement of this lever is reversed in Figs. 2 and 3. My invention as applied consists in automatically operating this lever to cut off the power as desired by the action of the spring when the weight upon the seat is released and to permit of it being operated to throw on the power only when the seat is occupied.

In Fig. 1 E represents an auxiliary arm pivoted at F which has an inclined surface G adjacent to said pivotal point, its upper extremity H being designed to engage the back of the controlling lever in a manner to throw the same forward at the desired time.

I indicates a cushion or seat which in practice is suitably hinged at the back or at one end. A vertically disposed rod J is normally held against the under side of this seat by means of a spring K in a manner to retain the seat in its normal raised position which is shown in Fig. 1. I connect to this rod a lever L which is pivoted at L' and as shown said lever is operated through the medium of the spring K before mentioned. This lever further contains a roll M which is designed to engage the inclined surface G of the auxiliary arm E before mentioned, in a manner to force the same forward and likewise the lever D. From this construction it will be seen that when the pressure upon the seat is released the spring K is permitted to act, thus throwing the forward end of the lever L into engagement and operating the lever D in a manner to cut off the power.

In Fig. 1 as shown my invention not only serves to cut off the power but apply a brake, this is done by simply attaching one end of a link N to the lever L, before mentioned, the opposite end being connected to an arm of a bell crank O pivoted to a stud P. Said other arm of this bell crank being connected by a rod Q with a band or member as shown partly encircling the brake drum Q' and suitably secured or anchored, all as conventionally indicated, as showing in effect a wrap-up or self tightening brake band. It will thus be apparent that when the lever L is drawn up to the position shown in full lines the brake is applied and when dropped down to the position shown in dotted lines it is released and it will be seen that even when the brake is applied by a light spring, in view of the nature of the brake shown, the momentum of the vehicle will tend to immediately tighten it as soon as the braking surfaces are caused to engage, and will thus bring the vehicle to a stand-still without the application of any great force to the brake levers. In the case of some styles of brake on automobiles it is known that very considerable force is needed even to materially retard the vehicle, and to effect such force with an automatic device might require such powerful and heavy spring and other mechanism as to make the device totally impracticable.

In Fig. 2 my invention, as above stated, is slightly modified and in that instance the rod J contains a rack and the spring for operating the same is applied direct. Within the rack is fitted a toothed arm R of the lever L the outer arm of which is provided with a strap S, it being obvious that when the seat is down as shown in the drawing the lever D is free to be thrown forward for the purpose of starting the machine and that it is automatically withdrawn by the action of the spring when the pressure is released.

In Fig. 3 the rod J is extended with an electrical switch plug T insulatedly applied, it being obvious that said plug is forced down in between the contacts x and y, thus forming a contact through which the electrical energy passes. A further connection of levers is illustrated in this figure for the purpose of showing a convenient manner in which the invention may be made to operate two levers instead of one as in the other instances. As will be seen the link S' is connected to an arm U of which V and W indicates additional arms to which straps S are applied, it being apparent that as the arm L is drawn in the connections serve to draw the levers to a vertical position, thus cutting off the power from the vehicle.

It will be obvious to those skilled in the art that it may be necessary to slightly alter the details of construction of my invention to properly apply it to the various types of machines and consequently I do not wish to be limited in the matter of these details, and as my invention is susceptible of various embodiments, it is to be understood that it is not limited to the exact construction herein shown and described, but

What I claim as my invention and desire to secure by Letters Patent is:

1. In a device of the class described, the combination with the controlling lever, of a spring actuated seat, connections thereof whereby said controlling lever is reversed by relieving the weight upon the seat.

2. In a device of the class described, the combination with the operating lever of an automobile, of a spring actuated seat, a movable rod connected therewith, means for reversing said operating lever by the upward movement of said rod and seat.

3. In an automobile, the combination of a movable part subject to the weight of the occupant, a device movable into predetermined position to effect the control of power of the vehicle, connections whereby said device is returned to a cut-off or zero position upon the removal of the weight of the occupant.

4. In an automobile, the combination of a movable seat subject to the weight of the occupant, a device movable into predetermined positions to effect the control of the power of the vehicle, connections whereby said power controlling device is automatically moved, upon the removal of the weight of the occupant.

5. In an automobile, a movable part subject to the weight of the occupant, a device movable to effect the control of power or speed, intermediate connections whereby said device cannot be moved from its zero or cut-off position when the vehicle is unoccupied.

6. In an automobile, a movable part subject to the weight of the occupant, a controlling device consisting of a substantially vertical lever movable longitudinally of the vehicle into predetermined positions for reguiaty, the application of power, intermediate connections including a spring and locking r lever, all substantially as and for the purpose described.

7. In an automatic stopping device for automobiles, the combination with the operating lever, of a movable seat, a spring for normally retaining said seat in an elevated position, a depending rod operatively connected to said spring and seat, bell crank lever connections between said rod and operating lever whereby the position of the latter is reversed by the action of said spring when the pressure on said seat is relieved.

8. In an automatic stopping device for vehicles, the combination with the starting and stopping levers, of a seat, means for normally retaining the same in an elevated position, an intermediate lever, connections between said seat and intermediate lever, and means for operating the starting and stopping levers from said connections and seat, substantially as described.

9. The combination in a stopping device for automobiles comprising connections with the power controlling levers, whereby the same may be operated when the seat of the vehicle is occupied, which comprises a lever L, connections between said lever and the controlling lever whereby the latter is operated, means for normally holding said lever L out of engagement with the controlling levers, connections with the seat whereby said parts are operated, substantially as described.

10. In an automobile, automatic controlling means including a movable part, spring actuated mechanism and connections acting upon a plurality of controlling levers or devices whereby upon the application of weight to the movable part the controlling levers are free to be operated, and upon the removal of the weight the levers or devices are returned to their zero or initial position, as and for the purpose described.

11. The combination in a stopping device for automobiles, of a movable seat, means for normally retaining the same in an elevated position, a depending rod attached thereto, a lever connected with said rod, straps between said lever and the controlling levers whereby the latter are operated by the disengagement of the seat.

12. The combination in a stopping device for automobiles the same comprising a movable seat, a spring for normally retaining the same in an elevated position, connections thereof with an intermediate lever whereby the same is swung upon its pivot, and an auxiliary lever with connections whereby the controlling lever is reversed by the operation of said intermediate lever.

13. In an automobile, a movable part subject to the weight of the occupant, a device movable to effect the control of power or speed, a self-tightening or wrap-up brake and connections, intermediate spring operated connections operable upon the removal of the weight of the occupant, whereby the controlling device is locked in zero or cut-off position, or returned to its zero or off position, and the brake connections moved to a position permitting the engaging brake surfaces to contact and co-operate to tighten the brake and effect the stopping of the vehicle.

14. In an automobile, a controlling means including a wrap-up or self-tightening brake, connections to move the braking surfaces out of and into contact with each other, a movable part subject to the weight of the occupant and intermediate connections including a light spring, whereby upon the release of the weight of the occupant the brake connections are released and permit the contacting of the engaging brake surfaces permitting the self operation of the brake and consequent retarding of the vehicles and an electrical switch including a movable switch member subject to operation by means of the aforementioned movable part.

15. In an automatic stopping device for vehicles, the combination of a spring actuated seat having a depending rod, a bell crank lever connected with and operated by said post, connections from said bell crank lever to the controlling levers whereby the latter are operated to stop the machine when the seat is unoccupied, substantially as shown and described.

16. An automatic stopping device for vehicles the same comprising a spring actuated seat having a depending post, a rack upon said post, a bell crank lever bearing a segment to engage said rack, connections from said bell crank lever to the controlling levers whereby the latter are operated by the removal of the weight from the seat, substantially as shown and described.

17. The combination with a seat of a vehicle, of a spring actuated rod depending from said seat, a pivoted lever connected with said rod, an auxiliary lever operated by said pivoted lever, controlling levers adapted to be engaged and operated by said auxiliary lever and connections from the pivoted lever to the vehicle brake whereby the latter is applied, substantially as shown and described.

18. In a vehicle provided with a motor and a source of power, the combination of a movable seat, of a lever, cut off devices actuated thereby and a spring adapted to actuate said lever whereby said seat is raised and communication broken between the source of power and the motor.

19. In an automobile, a contact through which electric energy passes for the propulsion of the vehicle, a movable switch member coöperating with said contact, a movable seat on said vehicle operated by the weight of the occupant, normally holding said movable contact member in position to close said electrical cricuit, and means coöperating with said movable part to automatically move said contact member and apply the brake.

Signed at Bridgeport, Fairfield county, Connecticut, this 22d day of February A. D. 1900.

CHARLES O. LAMBERT.

Witnesses:
C. M. NEWMAN,
EDWARD K. NICHOLSON.